(12) United States Patent
Fukushima

(10) Patent No.: US 8,883,265 B2
(45) Date of Patent: Nov. 11, 2014

(54) METHOD OF MANUFACTURING MAGNETIC RECORDING MEDIUM AND MAGNETIC RECORDING/REPRODUCING DEVICE

(75) Inventor: Masato Fukushima, Chiba (JP)

(73) Assignee: Showa Denko K.K., Tokyo (JP)

( * ) Notice: Subject to any disclaimer, the term of this patent is extended or adjusted under 35 U.S.C. 154(b) by 83 days.

(21) Appl. No.: 13/516,556

(22) PCT Filed: Dec. 7, 2010

(86) PCT No.: PCT/JP2010/071917
§ 371 (c)(1),
(2), (4) Date: Jun. 15, 2012

(87) PCT Pub. No.: WO2011/077943
PCT Pub. Date: Jun. 30, 2011

(65) Prior Publication Data
US 2012/0257300 A1 Oct. 11, 2012

(30) Foreign Application Priority Data
Dec. 21, 2009 (JP) .................. 2009-289519

(51) Int. Cl.
*G11B 5/84* (2006.01)
*G11B 5/72* (2006.01)
*G11B 5/855* (2006.01)

(52) U.S. Cl.
CPC . *G11B 5/855* (2013.01); *G11B 5/72* (2013.01)
USPC ...................................................... 427/523

(58) Field of Classification Search
None
See application file for complete search history.

(56) References Cited

U.S. PATENT DOCUMENTS

| | | | |
|---|---|---|---|
| 6,331,364 B1 | 12/2001 | Baglin et al. | |
| 8,634,155 B2 * | 1/2014 | Yasumori et al. | 360/59 |
| 2004/0091748 A1 | 5/2004 | Kamata et al. | |
| 2004/0101713 A1 | 5/2004 | Wachenschwanz et al. | |
| 2005/0036223 A1 | 2/2005 | Wachenschwanz et al. | |

(Continued)

FOREIGN PATENT DOCUMENTS

| JP | 05-205257 A | 8/1993 |
|---|---|---|
| JP | 2001-250217 A | 9/2001 |

(Continued)

OTHER PUBLICATIONS

Edi Suharyadi, et al., "Fabrication of Patterned Co/Pd Nanostructures Using E-Beam Lithography and Ga Ion-Irradiation," IEICE Technical Report MR2005-55 (Feb. 2006), pp. 21-26.

(Continued)

*Primary Examiner* — K. Wong
(74) *Attorney, Agent, or Firm* — Sughrue Mion, PLLC

(57) ABSTRACT

Provided is a method of manufacturing a magnetic recording medium capable of manufacturing at a high productivity a useful magnetic recording medium having high surface smoothness and excellent head floating characteristics. Such a method of manufacturing a magnetic recording medium includes: forming a magnetic layer on a nonmagnetic substrate; and partially injecting ions into the magnetic layer to modify magnetic characteristics at a location of the magnetic layer where the ions are injected and to form magnetically separated magnetic recording patterns, in which, when partially injecting ions into the magnetic layer, a carbon film is formed on the surface of the magnetic layer, the carbon film is partially thinned by patterning, and ions are partially injected into the magnetic layer through locations where the carbon film is thinned.

13 Claims, 1 Drawing Sheet

(56) References Cited

U.S. PATENT DOCUMENTS

| | | |
|---|---|---|
| 2010/0000966 A1 | 1/2010 | Kamata et al. |
| 2010/0020434 A1 | 1/2010 | Sakawalo et al. |
| 2010/0053797 A1 | 3/2010 | Fukushima et al. |
| 2010/0149680 A1* | 6/2010 | Ishibashi et al. ............... 360/75 |
| 2011/0013311 A1 | 1/2011 | Fukushima |

FOREIGN PATENT DOCUMENTS

| | | |
|---|---|---|
| JP | 2004-164692 A | 6/2004 |
| JP | 2004-178793 A | 6/2004 |
| JP | 2004-178794 A | 6/2004 |
| JP | 2008-052860 A | 3/2008 |
| JP | 2008-077788 A | 4/2008 |
| JP | 2009-181673 A | 8/2009 |
| WO | 2009/110444 A1 | 9/2009 |

OTHER PUBLICATIONS

International Search Report of PCT/JP2010/071917, dated Mar. 15, 2011.

* cited by examiner

METHOD OF MANUFACTURING MAGNETIC RECORDING MEDIUM AND MAGNETIC RECORDING/REPRODUCING DEVICE

TECHNICAL FIELD

The present invention relates to a method of manufacturing a magnetic recording medium for use in a hard disk device or the like, and a magnetic recording/reproducing device including a magnetic recording medium manufactured by the manufacturing method.

Priority is claimed on Japanese Patent Application No. 2009-289519, filed Dec. 21, 2009, the content of which is incorporated herein by reference.

BACKGROUND ART

In recent years, magnetic recording devices, such as a magnetic disk device, a flexible disk device, and a magnetic tape device, have considerably increased in application and have increased in importance. With regards to a magnetic recording medium which is used in these devices, the recording density has been significantly improved. In particular, after the introduction of an MR head and a PRML technique, the surface recording density has further significantly increased. A GMR head, a TuMR head, and the like have also been introduced, and the surface recording density continues to increase at a pace of about 1.5 times a year.

In regard to the magnetic recording medium, there is demand for attaining a higher recording density in the future. For this reason, there is demand for attaining a high coercive force of a magnetic recording layer, a high signal to noise ratio (SNR), or high resolution. In recent years, there is continuous effect to increase the surface recording density with improvement in a linear recording density and an increase in a track density.

In the latest magnetic recording devices, the track density has reached 250 kTPI. However, if the track density increases, there is interference between adjacent tracks by magnetic recording information, and the magnetization transition region of the boundary region becomes a noise source, causing damage to the SNR. This leads to deterioration of the bit error rate, interfering with improvement in the recording density.

In order to increase the surface recording density, it is necessary to make the size of each recording bit on the magnetic recording medium finer, and to secure the largest possible saturation magnetization and magnetic film thickness in each recording bit. However, if the recording bits are made fine, the minimum magnetization volume per bit decreases, and recorded data is lost due to magnetization reversal caused by thermal fluctuation.

Since the distance between tracks is small, the magnetic recording device requires a very high-precision track servo technique, and a method in which recording is performed widely, and reproduction is performed to be narrower than recording so as to exclude the influence of adjacent tracks is generally used. In this method, while it is possible to minimize the influence between tracks, it is difficult to sufficiently obtain a reproduction output, making it difficult to secure a sufficient SNR.

As one of the methods which solves the problem of thermal fluctuation and secures the SNR and a sufficient output, there is an attempt at forming concavo-convex patterns along the tracks in the surface of the magnetic recording medium and physically separating recording tracks, thereby increasing the track density. This technique is called a discrete track method, and a magnetic recording medium manufactured by the discrete track method is called a discrete track medium.

As an example of a discrete track method, a magnetic recording medium is known in which concavo-convex patterns are formed in the surface thereof and a magnetic recording layer is formed on a nonmagnetic substrate physically separated to form magnetic recording tracks and servo signal patterns physically separated (for example, see PTL 1).

This magnetic recording medium has a ferromagnetic layer which is formed on the surface of the substrate, on which a plurality of concavo-convex patterns are formed, through a soft magnetic layer, and a protective layer which is formed on the ferromagnetic layer. In this magnetic recording medium, a magnetic recording region which is physically separated from the periphery is formed in a convex region. According to this magnetic recording medium, since it is possible to suppress the occurrence of a magnetic domain wall in the soft magnetic layer, thermal fluctuation has little effect, and there is no interference between adjacent signals. Accordingly, it is possible to form a high-density magnetic recording medium with little noise.

As the discrete track method, there are a method in which tracks are formed after a magnetic recording medium having a thin film of several layers is formed, and a method in which a thin film of a magnetic recording medium is formed after concavo-convex patterns are formed directly on the substrate surface or concavo-convex patterns are formed in a thin-film layer for track formation (for example, see PTL 2 or PTL 3).

Of these, the former method is often called a magnetic layer processing type. In this method, since physical processing is done on the surface after the medium is formed, there is a drawback in that the medium is liable to be contaminated during a manufacturing process, and the manufacturing process is unusually complicated.

The latter method is often called an embossing type. In this method, the medium is not easily contaminated during a manufacturing process. Meanwhile, since the concavo-convex shape formed on the substrate continues in the formed film, there is a problem in that the floating posture and floating height of the recording/reproducing head which performs recording/reproducing while floating on the medium become unstable.

A method is also known in which a region between magnetic tracks of the discrete track method is formed by injecting nitrogen ions or oxygen ions into a magnetic layer formed in advance or by irradiating laser (see PTL 4). Meanwhile, in PTL 4, there is no description that a resist, a mask, or the like is provided at the time of ion injection or the like. If a resist, a mask, or the like is not provided, it is difficult to control ion injection or the like only in the region between the magnetic tracks.

A technique is also known in which, when manufacturing a so-called patterned medium where a magnetic recording pattern is arranged for each bit with given regularity, the magnetic recording pattern is formed through etching using ion irradiation or through amorphization of the magnetic layer (see NPL 1 and PTL 5).

Of these, PTL 5 describes a technique in which a mask is provided in a region other than the region between the magnetic tracks on the magnetic layer, ions or the like are irradiated, and organic resist, metal, $SiO_2$, or the like is used as a mask by ion injection.

CITATION LIST

Patent Literature

PTL 1: JP-A-2004-164692
PTL 2: JP-A-2004-178793
PTL 3: JP-A-2004-178794
PTL 4: JP-A-5-205257
PTL 5: U.S. Pat. No. 6,331,364

Non-Patent Literature

NPL 1: IEICE Technical Report MR2005-55 (2006-02), pp. 21 to 26 (Institute of Electronics, Information and Communication Engineers)

SUMMARY OF INVENTION

Technical Problem

When manufacturing a discrete track medium or a bit pattern medium, ion irradiation described in PTL 5 or the like is used, such that a magnetic recording medium having high smoothness can be manufactured. That is, in the method described in PTL 5, when patterning the magnetic layer, it is not necessary to physically process the magnetic layer and to perform concavo-convex processing on the substrate.

However, in practice, if ion irradiation is partially performed on the magnetic layer, the corresponding location is etched, and a concave portion is formed in the magnetic layer. This is because ion irradiation and ion etching are similar processing.

While the amount of ion acceleration or irradiation decreases to decrease the amount of etching of the surface of the magnetic layer, the effect of modifying the magnetic characteristics of the magnetic layer is degraded, and patterning of the magnetic layer is insufficient. The modification time is extended, and productivity is degraded.

The invention has been suggested in consideration of the situation in the related art, and an object of the invention is to solve the above-described problems and to provide a method of manufacturing a magnetic recording medium capable of manufacturing a useful magnetic recording medium having high surface smoothness and excellent head floating characteristics, and a magnetic recording/reproducing device including a magnetic recording medium manufactured by the manufacturing method.

Solution to Problem

The invention provides the following means.

(1) The invention provides a method of manufacturing a magnetic recording medium. The method includes forming a magnetic layer on a nonmagnetic substrate, and partially injecting ions into the magnetic layer to modify magnetic characteristics at a location of the magnetic layer where the ions are injected and to form a magnetically separated magnetic recording pattern. When partially injecting ions into the magnetic layer, a carbon film is formed on the surface of the magnetic layer, the carbon film is partially thinned by patterning, and ions are partially injected into the magnetic layer through locations where the carbon film is thinned.

(2) In the method described in (1), the magnetic characteristics may be modified by nonmagnetization or amorphization of the magnetic layer.

(3) In the method described in (1) or (2), the thickness of the locations where the carbon film is partially thinned may be in a range of 5 to 10 nm.

(4) In the method described in any one of (1) to (3), when patterning the carbon film, resist may be coated on the surface of the carbon film, a stamp whose surface has a concavo-convex shape may be used to transfer the concavo-convex shape to the surface of the resist, and the concave portion of the resist and the underlying carbon film may be etched.

(5) In the method described in (4), after the ions are partially injected into the magnetic layer, the resist and the carbon film may be removed.

(6) In the method described in any one of (1) to (5), the ions to be injected may be ions including one or more atoms selected from a group consisting of N, O, Ar, and Ne.

(7) The invention provides a magnetic recording/reproducing device. The magnetic recording/reproducing device includes a magnetic recording medium which is manufactured by the manufacturing method described in any one of (1) to (6), a medium drive unit which drives the magnetic recording medium in a recording direction, a magnetic head which performs a recording operation and a reproduction operation on the magnetic recording medium, head moving means for relatively moving the magnetic head with respect to the magnetic recording medium, and recording/reproducing signal processing means for inputting a signal to the magnetic head and reproducing an output signal from the magnetic head.

Advantageous Effects of Invention

As described above, in the invention, at the time of partial ion irradiation onto the magnetic layer, the carbon film which is partially thinned is provided on the surface of the magnetic layer, and ions are partially injected into the magnetic layer through the locations where the carbon film is thinned, thereby protecting the surface of the magnetic layer and preventing the ion injection locations of the magnetic layer from being etched. Therefore, if the carbon film is removed after ion injection, it is possible to obtain a magnetic layer having high surface smoothness while partially modifying the magnetic characteristics of the magnetic layer. A protective film is formed on the surface of the magnetic layer, making it possible to manufacture a magnetic recording medium having high smoothness with high productivity.

In the invention, since the magnetic recording medium manufactured by the above-described method is used, it is possible to obtain a magnetic recording/reproducing device having excellent head floating characteristics, excellent magnetic recording pattern separation performance, and a high recording density characteristic without being affected by signal interference between adjacent patterns.

DESCRIPTION OF EMBODIMENTS

Hereinafter, an embodiment of the invention will be described in detail with reference to the drawings.

The invention relates to a method of manufacturing a magnetic recording medium having a magnetic recording pattern magnetically separated on at least one surface of a nonmagnetic substrate, in which the modification (for example, nonmagnetization or the like) of the magnetic characteristics magnetically separating the magnetic recording pattern is done by injecting ions into the magnetic layer formed in advance. When magnetically separating the magnetic recording pattern, unlike the manufacturing method of the related art, instead of directly or physically separating the magnetic layer through dry etching, stamp processing, or the like, a carbon film which is partially thinned is provided on the surface of the magnetic layer, and ions are injected into the magnetic layer through locations where the carbon film is thinned.

Specifically, in the invention, the magnetic recording medium having a magnetic recording pattern magnetically separated refers to a so-called patterned medium where a magnetic recording pattern is arranged for each bit with given regularity, a medium where a magnetic recording pattern is arranged in a track shape, or a medium including a servo signal pattern or the like.

Of these, from the viewpoint of ease of manufacturing, it is preferable to apply the invention to a so-called discrete magnetic recording medium where a magnetic recording pattern magnetically separated is a magnetic recording track and a servo signal pattern.

Figure 1:
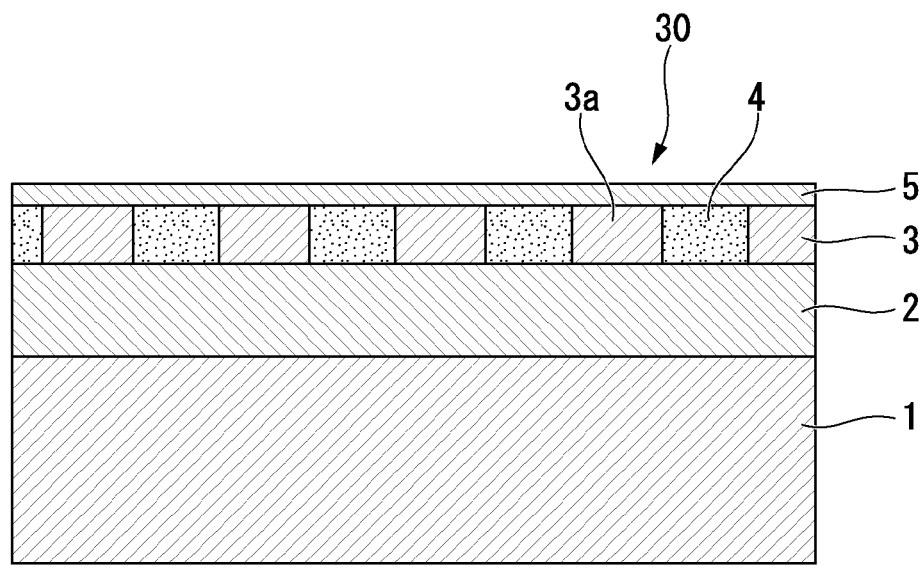
FIG. 1 is a sectional view showing an example of a magnetic recording medium which is manufactured according to the invention.

Hereinafter, as an example of a magnetic recording medium which is manufactured according to the invention, a discrete magnetic recording medium 30 shown in FIG. 1 will be described.

The magnetic recording medium 30 has a structure in which a soft magnetic layer and intermediate layer 2, magnetic recording patterns 3a between a magnetic layer 3 with a magnetic pattern formed thereon and locations (for example, nonmagnetized region) 4 where the magnetic characteristics of the magnetic layer 3 are modified, and an overlying protective layer 5 are formed on the surface of a nonmagnetic substrate 1, and a lubricant film (not shown) is further formed on the outermost surface.

In the magnetic recording medium 30, in order to increase a recording density, it is preferable that the width W of a magnetic portion (magnetic recording pattern 3a) of the magnetic layer 3 is equal to or smaller than 200 nm, and the width L of a modified nonmagnetic portion (nonmagnetized region 4) is equal to or smaller than 100 nm. Thus, a track pitch (W+L) becomes as narrow as possible in a range equal to or smaller than 300 nm so as to increase the recording density.

As the nonmagnetic substrate 1 used herein, an arbitrary substrate, such as an Al-alloy substrate made of, for example, Al—Mg mainly containing Al, or a substrate made of a nonmagnetic material, such as a substrate made of soda glass, aluminosilicate glass, crystallized glass, silicon, titanium, ceramics, or various resins, may be used. Of these, as the nonmagnetic substrate 1, an Al-alloy substrate, a glass substrate made of crystallized glass, or a silicon substrate is preferably used. The average surface smoothness (Ra) of the nonmagnetic substrate 1 is preferably equal to or smaller than 1 nm, more preferably, equal to or smaller than 0.5 nm, and still more preferably, equal to or smaller than 0.1 nm.

In the invention, the soft magnetic layer and intermediate layer 2 which is necessary for a vertical magnetic recording medium is formed on the surface of the nonmagnetic substrate 1. For example, an FeCoB layer is formed as the soft magnetic layer, and an Ru layer is formed as the intermediate layer.

The magnetic layer 3 is preferably a vertical magnetic recording layer so as to realize a high recording density regardless of an in-plane magnetic recording layer or a vertical magnetic recording layer. The magnetic layer 3 is preferably formed of an alloy mainly containing Co. For example, as the magnetic layer 3 for an in-plane magnetic recording medium, a laminated structure having a nonmagnetic CrMo underlayer and a ferromagnetic CoCrPtTa recording magnetic layer may be used.

As the magnetic layer 3 for a vertical magnetic recording medium, for example, a 70Co-15Cr-15Pt alloy (an alloy of 70 atomic % of Co, 15 atomic % of Cr, and 15 atomic % of Pt. The same applies the following description.), a 70Co-5Cr-15Pt-10SiO$_2$ alloy, or the like may be used.

The thickness of the magnetic layer 3 is equal to or greater than 3 nm and equal to or smaller than 20 nm, and preferably, equal to or greater than 5 nm and equal to or smaller than 15 nm. The magnetic layer 3 may be formed such that sufficient head output/input is obtained in accordance with the type of a magnetic alloy to be used and a laminated structure. The thickness of the magnetic layer 3 should be equal to or greater than a thickness enough to obtain a given or greater level of output when reproduction. In general, all the parameters representing recording/reproducing characteristics are deteriorated with an increase in output. Accordingly, it is necessary to set an optimum thickness.

Usually, the magnetic layer 3 is formed as a thin film by a sputtering method. In the invention, tracks and servo signal patterns are formed in the magnetic layer 3 as the magnetic recording patterns 3a magnetically separated.

As the protective layer 5, a carbonaceous layer of carbon (C), hydrogenated carbon (H$_x$C), nitrogenated carbon (CN), amorphous carbon, silicon carbide (SiC), or the like, or a protective layer material, such as SiO$_2$, Zr$_2$O$_3$, or TiN, which is normally used may be used. The protective layer 5 may have two or more layers.

The thickness of the protective layer 5 is preferably equal to or smaller than 10 nm. If the thickness of the protective layer 5 exceeds 10 nm, the distance between the head and the magnetic layer 3 increases, and sufficient intensity of an output/input signal is not obtained. Usually, the protective layer 5 is formed by a sputtering method or a CVD method.

A lubricant film is preferably used on the protective layer 5. As a lubricant which is used for the lubricant film, a fluorine-based lubricant, a hydrocarbon-based lubricant, or a mixture thereof may be used. Usually, the lubricant is formed at a thickness of 1 to 4 nm.

Next, when manufacturing the magnetic recording medium 30, as the feature of the invention, a step of forming the magnetic recording patterns 3a magnetically separated in the magnetic layer 3 will be specifically described.

In the invention, as the magnetic layer 3, for example, a 70Co-5Cr-15Pt-10SiO$_2$ alloy film is formed. Thereafter, a carbon film which serves as a mask of the magnetic recording patterns 3a is formed on the surface of the magnetic layer 3.

As the carbon film, in addition to carbon (C), hydrogenated carbon (H$_x$C), nitrogenated carbon (CN), and amorphous carbon may be used. The carbon film should have a thickness enough to shield ions to be injected in a subsequent ion injection step. Usually, the carbon film has a thickness equal to or greater than 20 nm. If the thickness of the carbon film is excessively great, it takes a lot of time for a subsequent step of patterning the carbon step, and productivity is degraded, or with an increase in the processing amount of the carbon film, the edge portion of the pattern is rounded and rectangularity of the concavo-convex pattern is degraded. For this reason, the upper limit of the thickness of the carbon film is preferably about 200 nm. While the carbon film may be formed using a known method, for example, a sputtering method or a CVD method is preferably used.

Thereafter, resist is coated on the surface of the carbon film, and a concavo-convex shape corresponding to the magnetic recording patterns 3a is formed in the resist using a nanoimprint technique or a photolithography technique.

As the resist, for example, SOG may be used. SOG is the abbreviation of spin-on-glass, and is a material which forms a glass film through spin coating. In the invention, with the feature of SOG in that liquid is coated, SOG is used as a mask material when patterning the carbon film. That is, SOG has high etching resistance when partially oxygen-etching the carbon film, allows control of softness by heating or the like, has excellent shape maintainability when a concavo-convex shape is transferred to the surface by a nanoimprint stamp, and has excellent processability by a photolithography technique. Examples of SOG include silicate-based SOG, methyl siloxane-based SOG, high methyl siloxane-based SOG, and the like, and one of them may be used.

The invention has a feature in that the resist is patterned, and the carbon film is partially thinned using the pattern, ions are irradiated onto the surface of the carbon film, such that ions are partially injected into the magnetic layer 3 through locations where the carbon film is thinned, while removing the resist.

In principle, ion injection is the same as ion etching or ion milling. If ion injection is performed, the surface of the corresponding portion is damaged more or less, and the surface is cut. In the invention, since the surface of an ion injected portion of the magnetic layer 3 is protected with the carbon film, the surface of the magnetic layer 3 is not cut by ion injection. Accordingly, if the carbon film as the mask is removed after a step of partially modifying the magnetic layer 3, the surface of the magnetic layer 3 having high smoothness in which the magnetic characteristics are partially modified is obtained.

In the invention, it is preferable that the thickness of the location where the carbon film is partially thinned is in a range of 5 to 10 nm. When the thickness of the carbon film is in this range, it is possible to prevent the surface of the magnetic layer 3 from being etched by the injected ions which transmit the carbon film and are injected into the magnetic layer 3. If the thickness of the carbon film is smaller than 5 nm, the surface protection effect of the magnetic layer 3 by the carbon film is degraded. If the thickness of the carbon film exceeds 10 nm, the amount of injected ions which reach the magnetic layer 3 decreases, such that the modification time of the magnetic layer 3 is extended. The injected ions are scattered by carbon atoms, and the resolution of the pattern formed in the magnetic layer 3 is degraded.

It should suffice that the width of a location where the carbon film is thick is equal to or smaller than 200 nm which is the same as the width W of a magnetic portion (magnetic recording pattern 3a) of the magnetic layer 3, and the width of a location where the carbon film is thin is equal to or smaller than 100 nm which is the same as the width L of a modified nonmagnetic portion (nonmagnetized region 4) of the magnetic layer 3.

In the invention, a method which forms a concavo-convex shape corresponding to a magnetic recording pattern in the resist can be executed by using a stamp with a concavo-convex shape formed on the surface thereof and transferring the concavo-convex shape to the surface of the coated resist. For example, after liquid resist is coated on the surface of the carbon film, and the stamp with the concavo-convex shape on the surface thereof is pressed against the surface of the resist before the resist is completely hardened, thereby transferring the concavo-convex shape to the surface of the resist. There is also a method in which an etching pattern is optically transferred by a normal photolithography technique, and the optically transferred pattern is then etched and patterned.

In regard to pattern formation after the resist is coated, a stamper is brought into close contact with the surface of the coated resist and pressed at a high pressure to form a concavo-convex shape in the surface of the resist. Alternatively, thermosetting resin, UV curable resin, or the like may be used to form a concavo-convex shape through etching.

As the stamper which is used in the above process, for example, a stamper in which a fine concavo-convex pattern is formed in a metal plate using an electron beam lithography method or the like may be used. As the material for the stamper, hardness and durability capable of enduring the process are required. For this reason, although, for example, Ni or the like may be used, any material may be used insofar as the material conforms to the above-described object. The stamper may have a concavo-convex pattern of a servo signal, such as a burst pattern, a gray code pattern, or a preamble pattern, in addition to the tracks for recording normal data.

In the invention, if ions are injected into the surface of the carbon film using an ion beam method or the like, ions are injected into a portion (concave portion) between convex portions including a magnetic recording track and a servo signal pattern in the concavo-convex pattern. In the invention, although, when injecting ions into the magnetic layer 3, atoms are ionized so as to accelerate atoms, it is thought that ions implanted into the magnetic layer 3 are neutralized.

In the invention, the discrete track magnetic recording medium 30 is manufactured by the above-described method, thereby minimizing coercive force or residual magnetization at a location of the magnetic layer 3 where ions are injected. Therefore, it becomes possible to eliminate write blurring at the time of magnetic recording, thereby providing the magnetic recording medium 30 having a high surface recording density. This is because ions are injected into the magnetic layer 3, and the magnetic layer 3 is changed to a nonmagnetic material, the crystal structure of the magnetic layer 3 is changed to deactivate the magnetic layer 3, or the magnetic layer 3 is amorphized and deactivated.

That is, in the invention, the nonmagnetized regions 4 which magnetically separate the magnetic recording patterns 3a are formed by injecting ions into the magnetic layer 3 formed in advance evenly in the thickness direction of the magnetic layer 3 and partially amorphizing the magnetic layer 3. In order to realize this ion injection, it is preferable that ions having the distribution of acceleration energy with a linear ion accelerator which does not concentrate ion energy are used.

In the invention, when the magnetic layer 3 is amorphized, this indicates that the atomic arrangement of the magnetic layer 3 is an irregular atomic arrangement having no long-distance order. Specifically, the amorphization indicates that fine crystal grains smaller than 2 nm are arranged in a random manner. The atomic arrangement is confirmed by an analytical method in a state where the peak representing the crystal plane is not recognized or only a halo is recognized by X-ray diffraction or electron beam diffraction.

In the invention, as the ions which are injected using an ion beam method or the like, ions, such as N, O, Ar, or Ne, which easily transmits the carbon film and has a small atomic radius are preferably used. In regard to the injection of ions, such as N, by the ion beam, the ions are injected into the magnetic layer 3 using a commercial ion injector.

The invention has an object to inject ions into the magnetic layer 3, to amorphize the crystal of the corresponding portion, and to allow the atoms of the ions injected into the amorphous portion to be distributed evenly. Accordingly, it is necessary to make the penetration depth evenly in the thickness direction of the magnetic layer 3. The depth of the ions to be injected is determined at an appropriate time relative to the penetration depth by an acceleration voltage of the ion injector.

When removing the resist and the carbon film remaining on the surface of the magnetic layer 3 after the magnetic recording patterns 3a are formed in the magnetic layer 3, dry etching, reactive ion etching, ion milling, or the like may be used. As the result of this processing, the patterned smooth magnetic layer 3 is exhibited. Thereafter, the protective layer 5 is formed on the surface of the magnetic layer 3. In regard to the formation of the protective layer 5, in general, a method in which a thin film of diamond like carbon is formed using P-CVD or the like is used, and a method of forming the protective layer 5 is not particularly limited.

Figure 2:
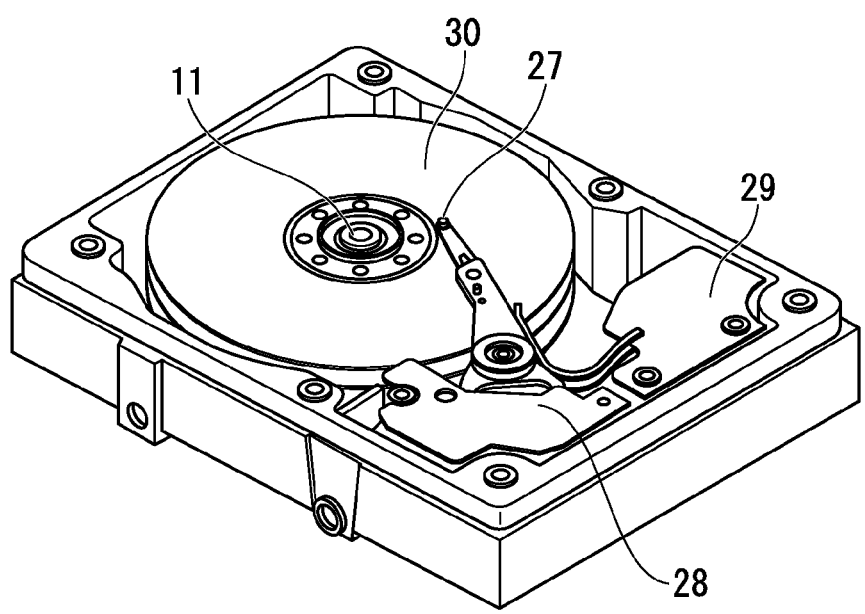
FIG. 2 is perspective view showing an example of a magnetic recording/reproducing device to which the invention is applied.

Next, FIG. 2 shows the configuration of a magnetic recording/reproducing device including the magnetic recording medium 30 manufactured according to the invention.

The magnetic recording/reproducing device includes the magnetic recording medium 30 of the invention, a medium drive unit 11 which drives the magnetic recording medium 30 in a recording direction, a magnetic head 27 which has a recording unit and a reproducing unit, a head drive unit 28 which relatively moves the magnetic head 27 with respect to the magnetic recording medium 30, and a recording/reproducing signal system 29 in which recording/reproducing signal processing means for signal input to the magnetic head 27 and output signal reproduction from the magnetic head 27 is combined.

With this combination, it becomes possible to construct a magnetic recording device having a high recording density. The recording tracks of the magnetic recording medium 30 are processed magnetically discontinuously, such that, while the reproducing head width is narrower than the recording head width so as to exclude the influence of the magnetization transition region of the track edge portion in the related art, the reproducing head width and the recording head width substantially have the same width at the time of operation. Therefore, it becomes possible to obtain sufficient reproduction output and high SNR.

The reproducing unit of the magnetic head 27 is constituted by a GMR head or a TuMR head, such that it is possible to obtain sufficient signal intensity even with a high recording density, thereby realizing a magnetic recording device having a high recording density. If the magnetic head 27 is floated with a floating amount of 0.005 μm to 0.020 μm to be lower than the related art, it is possible to a large-capacity and reliable magnetic recording device with improved output and a high device SNR. If a signal processing circuit by a maximum likelihood decoding method is combined, it is possible to further improve a recording density. For example, even when recording/reproduction is performed with a recording density of track density 100 or more ktracks/inch, linear recording density 1000 or more kbits/inch, or 100 or more Gbits per square inch, a sufficient SNR is obtained.

Example

Hereinafter, the effects of the invention will become apparent by Example. The invention is not limited to the following example, and may be appropriately changed without departing from the spirit and scope of the invention.

In this example, first, a vacuum chamber in which an HD glass substrate was set was evacuated in advance at equal to or smaller than $1.0 \times 10^{-5}$ Pa. The used glass substrate is made of crystallized glass having components of $Li_2Si_2O_5$, $Al_2O_3$—$K_2O$, $Al_2O_3$—$K_2O$, $MgO$—$P_2O_5$, and $Sb_2O_3$—$ZnO$, the outer diameter is 65 mm, the inner diameter is 20 mm, and the average surface roughness (Ra) is 2 angstrom.

Next, FeCoB as a soft magnetic layer, $Ni_6W$ and Ru as an intermediate layer, and a 70Co-5Cr-15Pt-10SiO$_2$ alloy as a magnetic layer were laminated on the glass substrate using a DC sputtering method, and a carbon film was laminated using a P-CVD method. The thickness of the FeCoB soft magnetic layer was 60 nm, the thickness of the $Ni_6W$ first intermediate layer was 5 nm, the Ru second intermediate layer was 10 nm, the magnetic layer was 15 nm, and the carbon film was 50 nm. Thereafter, the magnetic recording patterns were formed in the magnetic layer.

That is, when forming the magnetic recording patterns in the magnetic layer, first, methyl siloxane-based SOG was coated on the carbon film by spin coating. The thickness of SOG at this time was 400 nm. SOG includes 10% of an Si—O bond relative to all bonds of SOG in quantity (the same applies to the following description). SOG was heated and hardened, and the Si—O bond included in SOG was increased to 25% relative to all bonds included in SOG.

Next, a Ni-alloy stamp patterned at a depth of 200 nm was used to transfer the pattern to the surface of SOG. The thickness of the resist of the convex portion after transfer was 250 nm, and the thickness of the resist of the concave portion was 50 nm. Thereafter, SOG was further heated and hardened, and the Si—O bond included in SOG was increased to 80% relative to all bonds included in SOG. The thickness of the resist of the convex portion after heating and hardening was 150 nm, and the thickness of the resist of the concave portion was 30 nm.

Next, the concave portion of the resist and a portion of the underlying carbon film were removed by dry etching. The dry etching conditions at this time were that oxygen gas was 40 sccm, pressure was 0.3 Pa, high-frequency plasma power was 300 W, DC bias was 30 W, and etching time was 30 seconds. The thickness of the carbon film was 8 nm.

Next, partial ion injection into the magnetic layer was carried out. The ion injection conditions were that nitrogen gas was 10 sccm, pressure was 0.1 Pa, acceleration voltage was 300 V, and ion injection time was 30 seconds. With this processing, at the locations of the magnetic layer subjected to ion injection, coercive force was decreased about 95%, and the magnetic layer was substantially nonmagnetized.

Next, the resist and the carbon film were removed by dry etching. The dry etching conditions were that oxygen gas was 40 sccm, pressure was 0.5 Pa, high-frequency plasma power was 300 W, DC bias was 50 W, and etching time was 45 seconds. Thus, the magnetic recording patterns magnetically separated were formed in the magnetic layer.

Next, the protective layer made of carbon at a thickness of 5 nm was formed on the magnetic layer, and the fluorine-based lubricant film was finally coated at a thickness of 2 nm. Thus, the manufacturing of a magnetic recording medium was completed.

In regard to the magnetic recording medium manufactured in this example, the electromagnetic conversion characteristics were evaluated using a spin stand. At this time, as a head for evaluation, a vertical recording head was used on the recording side, and a TuMR head was used on the reading side. The SNR value and 3T-squash (triple track-squash) when a signal of 750 kFCI was recorded were measured. The term "3T-squash" indicates signal deterioration of a center track at the time of double-sided adjacent track write, and has a numerical value expressed by (residual signal intensity Vp–p)/(original signal intensity Vp–p)×100(%). As this value approaches the 100%, it is evaluated that the adjacent track write resistance is strong.

As a result, the magnetic recording medium obtained in this example had the SNR of 13.1 dB, the 3T-squash of 85%, and excellent RW characteristics. This is considered to be because the surface of the magnetic recording medium is smooth, the head floating characteristics are stable, read and write are performed at a predetermined floating height, and the magnetization state of a region between magnetic tracks completely disappears.

The RW characteristics, such as the SNR or 3T-squash, were confirmed, and in the sample of this example, the separation by the nonmagnetized region between the tracks was confirmed. That is, in the sample of this example, ion injection into the magnetic layer was performed by the ion beam, and it was thus confirmed that the magnetic recording patterns magnetically separated were formed in accordance with the pattern shape of the resist formed in a concavo-convex shape.

After the measurement of the electromagnetic conversion characteristics has ended, in regard to the magnetic recording medium of this example, the surface roughness was measured using an AFM. Specifically, the surface roughness (Ra) of the magnetic recording medium of this example was measured with a 10 μm field of view using an AFM manufactured by Digital Instrument. Other settings were made in a resolution 256×256 tapping mode at a sweep rate of 1 μm/sec. As a result, the magnetic recording medium of this example had the surface roughness Ra of 0.28 nm, which is a significantly low value. Thus, it is thought that the head floating characteristics are stabilized in the above-described manner.

In regard to the magnetic recording medium of this example, the glide avalanche characteristics were evaluated. For the evaluation, a 50% slider head manufactured by Glide Lite was used, and measured using a DS4100 device manufactured by Sony Tektro. As a result, in the magnetic recording medium of this example, it was understood that the glide avalanche was low to 4.9 nm, and the head floating characteristics were satisfactory.

INDUSTRIAL APPLICABILITY

According to the invention, it is possible to provide a magnetic recording medium which can secure stability of head floating and has excellent magnetic recording pattern separation performance and an excellent high recording density characteristic without being affected by signal interference between adjacent patterns. It is also possible to simplify a production process, thereby significantly contributing to productivity improvement.

REFERENCE SIGNS LIST

1: nonmagnetic substrate
2: soft magnetic layer and intermediate layer
3: magnetic layer
4: nonmagnetized region
5: protective layer
11: medium drive unit
27: magnetic head
28: head drive unit
29: recording/reproducing signal system
30: magnetic recording medium

The invention claimed is:

1. A method of manufacturing a magnetic recording medium, the method comprising:
   forming a magnetic layer, which has a substantially flat surface, on a nonmagnetic substrate;
   forming a carbon film on the surface of the magnetic layer;
   performing patterning of the carbon film to partially reduce the thickness of the carbon film and form locations where the carbon is thinned; and
   partially injecting ions into the magnetic layer through the locations, where the carbon film has been thinned, to modify magnetic characteristics of locations of the magnetic layer by the injection of the ions and obtain magnetically separated magnetic recording patterns in the magnetic layer.

2. The method according to claim 1, wherein the magnetic characteristics are modified by non-magnetization or amorphization of the magnetic layer.

3. The method according to claim 1, wherein the thickness of the locations where the carbon film is partially thinned is in a range of 5 to 10 nm.

4. The method according to claim 1, wherein, when patterning the carbon film, resist is coated on the surface of the carbon film, a stamp whose surface has a concavo-convex shape is used to transfer the concavo-convex shape to the surface of the resist, and the concave portion of the resist and the underlying carbon film are etched.

5. The method according to claim 4, wherein, after the ions are partially injected into the magnetic layer, the resist and the carbon film are removed.

6. The method according to claim 1, wherein the ions to be injected are ions including one or more atoms selected from a group consisting of N, O, Ar, and Ne.

7. The method according to claim 2, wherein the thickness of the locations where the carbon film is partially thinned is in a range of 5 to 10 nm.

8. The method according to claim 2, wherein, when patterning the carbon film, resist is coated on the surface of the carbon film, a stamp whose surface has a concavo-convex shape is used to transfer the concavo-convex shape to the surface of the resist, and the concave portion of the resist and the underlying carbon film are etched.

9. The method according to claim 3, wherein, when patterning the carbon film, resist is coated on the surface of the carbon film, a stamp whose surface has a concavo-convex shape is used to transfer the concavo-convex shape to the surface of the resist, and the concave portion of the resist and the underlying carbon film are etched.

10. The method according to claim 7, wherein, when patterning the carbon film, resist is coated on the surface of the carbon film, a stamp whose surface has a concavo-convex shape is used to transfer the concavo-convex shape to the surface of the resist, and the concave portion of the resist and the underlying carbon film are etched.

11. The method according to claim 8, wherein, after the ions are partially injected into the magnetic layer, the resist and the carbon film are removed.

12. The method according to claim 2, wherein the ions to be injected are ions including one or more atoms selected from a group consisting of N, O, Ar, and Ne.

13. The method according to claim 3, wherein the ions to be injected are ions including one or more atoms selected from a group consisting of N, O, Ar, and Ne.

* * * * *